United States Patent [19]

Egeter

[11] Patent Number: 5,713,671
[45] Date of Patent: Feb. 3, 1998

[54] ADJUSTABLE BEARING ASSEMBLY

[75] Inventor: Klaus Egeter, Augsburg, Germany

[73] Assignee: Renk Aktiengesellschaft, Augsburg, Germany

[21] Appl. No.: 618,424

[22] Filed: Mar. 18, 1996

[30] Foreign Application Priority Data

Mar. 17, 1995 [DE] Germany .................. 195 09 768.8

[51] Int. Cl.$^6$ ...................................................... F16C 17/00
[52] U.S. Cl. .................. 384/248; 384/249; 384/253; 384/264
[58] Field of Search ........................... 384/247–274

[56] References Cited

U.S. PATENT DOCUMENTS

| | | |
|---|---|---|
| 1,571,557 | 2/1926 | Paul . |
| 2,594,836 | 4/1952 | Wunderlich . |
| 2,711,299 | 6/1955 | Dugle . |
| 4,095,856 | 6/1978 | Markovitz . |
| 4,880,320 | 11/1989 | Haines et al. ............. 384/261 |

FOREIGN PATENT DOCUMENTS

| | | |
|---|---|---|
| 41447 | 2/1887 | Germany . |
| 119922 | 6/1900 | Germany . |
| 321198 | 5/1920 | Germany . |
| 341203 | 9/1921 | Germany . |
| 599706 | 6/1934 | Germany . |
| 819335 | 10/1951 | Germany . |
| 1016983 | 10/1957 | Germany . |
| 2004006 | 10/1970 | Germany . |
| 7316999 | 5/1973 | Germany . |
| 9103425 | 3/1991 | Germany . |
| 4222176 | 1/1994 | Germany . |
| 641255 | 2/1984 | Switzerland . |
| 2055151 | 2/1981 | United Kingdom . |

*Primary Examiner*—Lenard A. Footland
*Attorney, Agent, or Firm*—Natter & Natter

[57] ABSTRACT

An adjustable bearing assembly includes a bearing housing and a bearing body fixed to a carrier and disposed within the housing. Set screws are provided to adjustably position the carrier, hence the bearing body relative to the housing without disassembling the bearing. After the bearing body position has been adjusted, cap screws are employed to fix the carrier against movement relative to the housing and relative to a support surface. In an alternate embodiment, the carrier is in engagement with an inner eccentric ring which, in turn, is engaged by an outer eccentric ring, both rotatably mounted within the housing. The axes of the eccentric rings are spaced from one another and are parallel to the axis of the rotating shaft. Rotation of the eccentric rings relative to one another and to the housing adjusts the position of the bearing body.

18 Claims, 3 Drawing Sheets

ADJUSTABLE BEARING ASSEMBLY

BACKGROUND OF THE INVENTION

1. Field of the Invention

This invention relates generally to bearing assemblies and more particularly to a bearing assembly having a bearing body which is adjustable, relative to a bearing housing.

2. Related History

Many applications required the precise positioning of machine shafts and spindles to achieve dynamic rigidity and assure that the shafts ran true. Typical examples included systems employing precision gear engagements wherein axial coincidence of gear pinion spindles, relative to their fixed bearings, was critical, due to effects on wear resistance and dynamic stability of the gearing.

In some applications employing vertically supported motors, such as an electric motor mounted with its armature in a vertical axis and having oil lubricated journal bearings, self excited cross oscillation, i.e. oil whip, was encountered due to the nonlinear resiliency and damping characteristics of the oil film. Precision adjustment of the journal bearing has been employed to provide dynamic stability in these instances.

Precision tolerances with respect to fit, form and position of the respective components, including shafts and bearings was required in these and numerous other applications. This, of course, resulted in excessive fabrication complexities and costs associated with meeting stringent tolerance requirements.

Attempts have been made to reduce such costs, with respect to journal bearing applications, by providing a bearing assembly wherein the position of a shaft, relative to the bearing, i.e. bearing play, was adjustable. An example of such adjustable bearing was a bearing structure known as a Mackensen adjustable bearing which included a bearing housing, carrying a bearing body with three shim strips positioned between an inner cylindrical surface of the bearing housing and the outer surface of the bearing body.

To adjust bearing play or to change the shaft position relative to the bearing housing, the bearing assembly was disassembled and different shim strips were inserted. The procedure was complicated and labor intensive, since the original shims were required to be removed from the bearing assembly and because shims were required to be fabricated for each desired bearing play. Further, it was not always possible to adjust bearing play due to elastic deformation of the bearing body over an extended period of time.

In bearings with tiltable pads or shoes carrying bearing faces, it was possible to change the position of a shaft relative to the bearing by adjusting or changing individual tilt pads or shoes. Because a significant number of tilt shoes engaged the shaft, it was a complicated and time consuming procedure to adjust or substitute the individual tilt pads to position the shaft and/or achieve the specified bearing play.

A further approach toward providing an adjustable bearing was exemplified in the Ten Bosch lathe bearing which comprised a bearing body having an axial conical seat in a bearing housing. To decrease bearing play, a tension nut was employed to force the bearing body deeper into the conical seat of the bearing housing.

In spherical bearing assemblies, the axis of the shaft was pivotable about the bearing center, however, in these assemblies it was not possible to adjust either bearing play or to laterally displace a shaft.

SUMMARY OF THE INVENTION

In compendium, the present invention comprises an adjustable bearing assembly including a journal bearing body which is fixed to a carrier. The carrier is secured to a bearing housing. Set screws are provided to adjustably position the carrier, hence the bearing body, relative to the housing without taking the bearing assembly apart. After the bearing body position has been adjusted, bolts are employed to fix the carrier relative to the housing.

In instances wherein a rotating shaft is axially fixed, adjustment of the carrier relative to the bearing housing adjusts the bearing body relative to the shaft for uniform bearing play.

Adjustment of the bearing carrier relative to the housing may be employed in a technique for positioning an axially displaceable rotating shaft. Before the shaft is locked into position, the shaft, carried in the bearing body, is moved to a desired position by adjusting the carrier. Thereafter, the carrier is fixed and the shaft is then axially locked. The carrier may then be adjusted to provide uniform clearance between the bearing body and the running periphery of the shaft.

In an alternate embodiment, a bearing housing carries a pair of eccentric rings. The bearing body is fixed to a radially inner eccentric carrier, the outer periphery of which engages an outer eccentric carrier in a bearing housing. The outer eccentric carrier includes a circular periphery which engages a cylindrical inner face of the housing. The bearing body is adjusted relative to the housing by rotating both eccentric carriers relative to one another and to the housing.

From the foregoing, it will be appreciated that it is an aspect of the present invention to provide an adjustable bearing assembly which overcomes the deficiencies of the background history aforementioned.

A feature of the present invention is to provide an adjustable bearing assembly of the general character described which is well suited to meet the conditions of practical usage.

A consideration of the present invention is to provide an adjustable bearing assembly of the general character described which enables machines having rotating shafts to be manufactured with greater tolerances, hence reduced fabrication costs.

A further aspect of the present invention is to provide an adjustable bearing assembly of the general character described wherein the position of a bearing body may be adjusted relative to a bearing housing without disassembly of the bearing.

Another feature of the present invention is to provide an adjustable bearing assembly of the general character described which utilizes standard set screws for effecting adjustment of a bearing relative to a bearing housing.

To provide an adjustable bearing assembly of the general character described which is well adapted for low cost mass production fabrication techniques is a further aspect of the present invention.

Another consideration of the present invention is to provide an adjustable bearing assembly of the general character described which provides greater latitude in manufacturing tolerances of bearings and shafts while assuring precision accurate positioning and true running of components.

A further aspect of the present invention is to provide an adjustable bearing assembly of the general character described which simplifies radial adjustment of motor bearings such that radial forces can be generated to stabilize a rotor dynamically, thereby avoiding oil whip.

A still further feature of the present invention is to provide an adjustable bearing assembly of the general character described with simplified adjustment procedures whereby the position of a bearing body may be adjusted relative to a bearing housing by relatively unskilled workers.

Yet another consideration of the present invention is to provide an adjustable bearing assembly of the general character described which may be embodied in a spherical bearing.

Other aspects, features and considerations in part will be obvious and in part will be pointed out hereinafter.

With these ends in view, the invention finds embodiment in the various combinations of elements, arrangements of parts and series of steps by which the aspects, features and considerations aforesaid and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings in which is shown some of the various possible exemplary embodiments of the invention.

DESCRIPTION OF THE PREFERRED EMBODIMENTS

Figure 1:
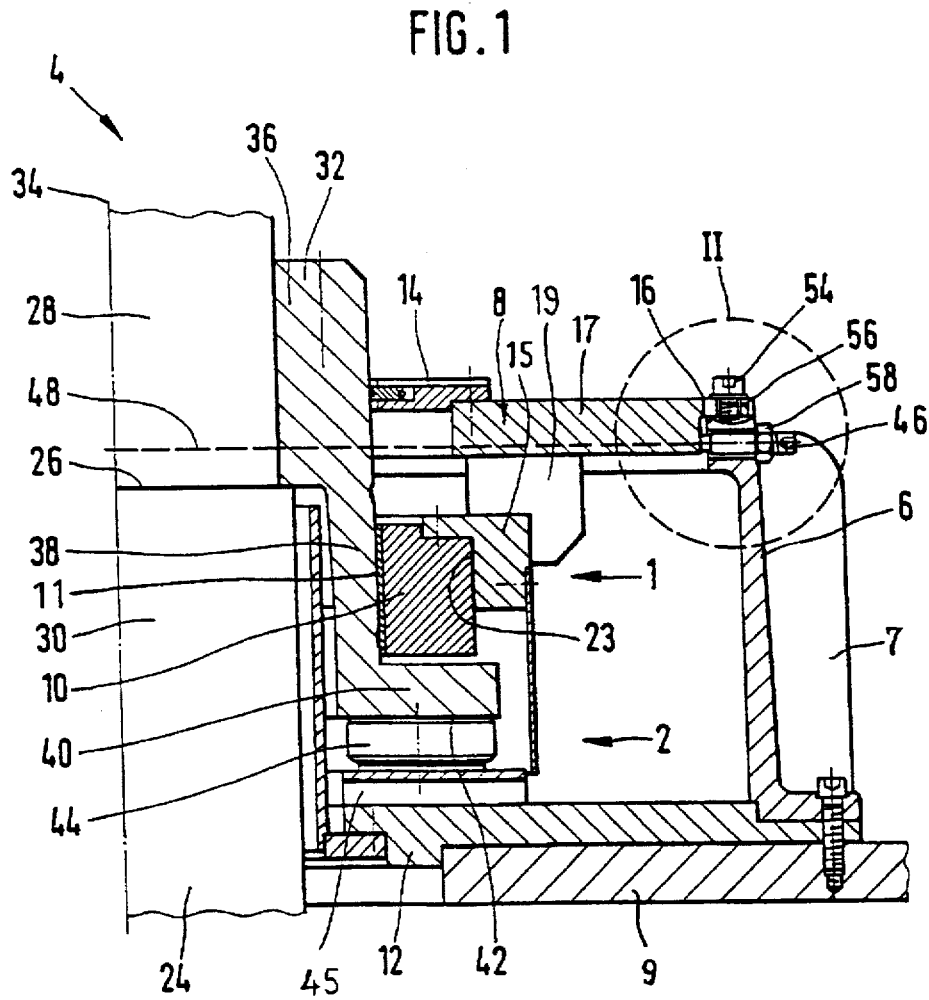
FIG. 1 is a fragmentary vertical sectional view through an adjustable bearing assembly constructed in accordance with and embodying the invention configured as a journal-thrust bearing and showing a bearing body fixed to a carrier which, in turn, is adjustable relative to a bearing housing.

Referring now in detail to the drawings, the reference numeral 4 denotes generally an adjustable bearing assembly constructed in accordance with and embodying the invention. The bearing assembly 4 is configured as a combined journal-thrust bearing and includes a journal bearing subassembly, denoted generally by the reference numeral 1 and a thrust bearing subassembly, denoted generally by the reference numeral 2.

The bearing assembly 4 includes a generally cylindrical housing 6, the outer periphery of which includes a plurality of spaced radially projecting webs 7. A peripheral bottom flange 5 includes apertures through which bolts extend to fix the housing 6 against a rigid support plate 9 of a machine or apparatus carrying the adjustable bearing assembly 4. An annular base platen 12 is sandwiched between the housing flange 5 and the support plate 9.

Contained within the assembly 4 is an annular journal bearing body 10 having a bearing liner 11. A bearing carrier 8 supports and positions the bearing body 10 within the housing 6. The bearing carrier 8 includes an annular hub 15 having a shoulder 23 against which the body 10 is placed and fixed, as by bolts or the like. The carrier 8 further includes an annular housing cover 17 joined to the hub 15 by an integral web 19.

The bearing assembly 4 rotatably supports a vertical shaft 24 having a center line 34. The shaft 24 is generally cylindrical and includes an upper portion 28 of substantially uniform diameter and a lower portion 30 of uniform, larger diameter, with the portions 28, 30, separated by a step shoulder 26.

Secured to the shaft 24 is a bell shaped socket or collar 32 which provides running surfaces for the bearing assembly 4. The collar 32 includes a neck 36 having a reduced diameter bore which tightly engages the shaft upper portion 28 and abuts an axial stop provided by the step shoulder 26. Preferably, the collar 32 is press fit or shrink fit over the shaft such that it rotates unitarily with the shaft. Additional or alternate securement means may be provided to assure that the collar 32 is not displaceable relative to the shaft as a result of axial and torsional forces.

From its neck 36, the collar 32 extends downwardly to a collar section 38 having, on its outer surface, a cylindrical running face in engagement with a bearing face of the liner 11. The collar section 38 includes an enlarged bore radially spaced from the corresponding lower section 30 of the shaft 24.

The specified radial bearing play for a particular application constitutes one half the difference between the inner diameter of the liner 11 at its bearing face and the outer diameter of the collar section 38 at its cylindrical running face.

The collar section 38 terminates at a radial base flange 40 having a substantially planar annular face 42 which comprises a thrust engagement surface for the thrust bearing subassembly 2. The thrust bearing subassembly 2 includes a plurality of pads or shoes 44, equidistantly spaced along an annular support 45 which is fixed to the bottom platen 12. The planar upper faces of the pads or shoes 45 constitute thrust bearing surfaces which engage the annular face 42 to prevent downward axial displacement of the shaft 24 relative to the housing 6 and the support plate 9.

At the top of the bearing assembly 4, the shaft 24 and the neck 36 of the collar 32 project through a central opening in the annular cover 17 of the carrier 8. A seal ring 14 is removably seated in the central opening of the cover 7 and engages the neck 36 to retain lubricating oil within the bearing housing 6.

Figure 2:
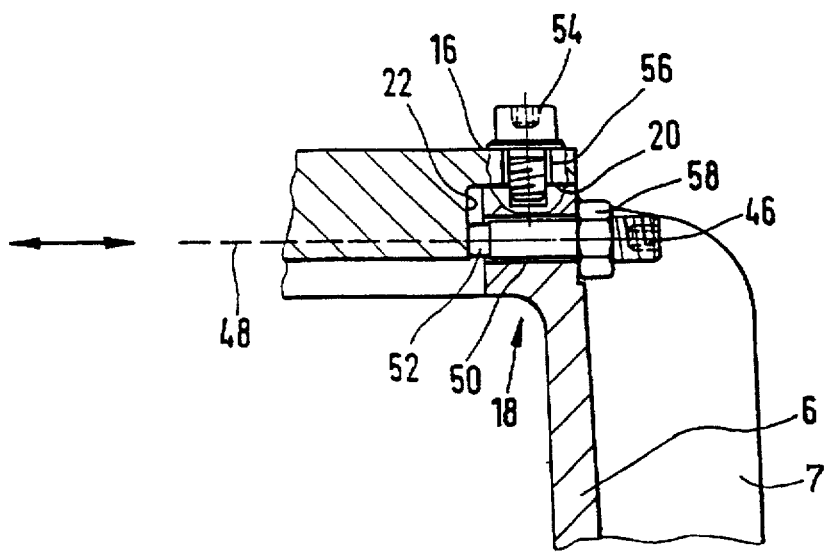
FIG. 2 is a magnified partial view of the bearing assembly, showing the adjustable engagement between the carrier and the housing, and depicted in circle II of FIG. 1.

With reference now to the partial view of FIG. 2, it will be seen that the cover 17 is securely mounted and fixed to the upper edge of the housing 6 by a plurality of bolts or cap screws 54 which extend through oversized bores 56 in a peripheral lip 16 of the cover 17. The cap screws 54 are engaged in vertical threaded apertures extending downwardly (parallel to the shaft axis 34) from the upper edge of the housing 6.

At the upper edge of the housing 6, a thick walled annular flange 18 is formed. The flange 18 is seated in a groove or recess formed by the reduced thickness of the cover peripheral lip 16 as compared with the cover thickness and is defined in a horizontal plane by an undersurface 20 of the lip 16 and in a vertical plane, by a cylindrical peripheral wall 22 of the cover 17.

In accordance with the invention, the journal bearing subassembly 1 is adjustably positioned within the housing 6 along a horizontal adjusting or setting plane 48 by a plurality of screws 46 equidistantly spaced along the circumference of the cylindrical housing 6 in a thickened wall annular flange 18. The set screws 46 are engaged in radial threaded apertures 50 formed in the flange 18 with the axis of each threaded aperture 50 lying within the plane 48. It should be noted that an end portion 52 of each set screw 46 buts against the cylindrical wall 22 of the cover 17.

It is also significant to note that the set screws 46 do not secure the carrier 8 against radial forces generated by engagement of the bearing body 10 and the shaft collar section 38 but rather serve only for laterally adjusting the position of the bearing body, hence the bearing liner face, in a radial direction. The radial forces generated by engagement between the shaft 24 and the bearing body 10 are transmitted to the bearing housing 6 through the cap screws 54 which secure the carrier cover 17 to the housing.

In order to adjust the position of the bearing body within the housing 6, the cap screws 54 are loosened. The oversized bores 56 are dimensioned so as to permit lateral movement of the cover 17, hence the carrier 8 and the bearing body 10, relative to the cap screws 54 which are laterally fixed to the housing 6.

The set screws 46 are then rotated for adjustment of the bearing body, i.e. bearing face of the liner 11, relative to the collar section 38 for uniform radial clearance and/or for the adjustment of the bearing body, together with a laterally moveable shaft 24, relative to the bearing housing and the support plate 9 for positioning the shaft 24.

Selected set screws 46 are rotated to advance radially inwardly or retract outwardly to cause lateral displacement of the cover 17 within the setting plane 48. Because the set screws 46 are equidistantly positioned circumferentially around the bearing housing 6, by corresponding adjustment of the set screws 46 within specific adjustment limits, any desired position of the bearing body 10 can be set relative to the shaft 24 or relative to the bearing housing, limited only by the lengths of the set screws and the size of the bores 56.

In instances wherein the shaft 24 is radially fixed, the adjustment limits are reached when the circumference of the collar section 38 contacts the inner bearing surface of the bearing liner 11. The maximum displacement corresponds to the specified bearing play, which is constant.

For example, to set a uniform bearing play, the seal ring 14 is removed from the cover 17 to provide an access opening and bearing play is measured with a feeler or thickness gage extended through the access opening at several circumferential positions.

The position of the bearing body is subsequently changed relative to the axially fixed shaft 24 by rotation of the set screws 46 for uniform bearing play about the circumference of the carrier section 38. Once uniform play has been achieved, the set screws 46 are fixed by lock nuts 58 which are tightened against the outside of the housing flange 18. The carrier 8 is then rigidly fixed, relative to the housing 6, by tightening the cap screws 54.

In instances wherein it is necessary to change the axial position of the shaft 24 relative to the bearing housing and the support plate 9, in order to meet specific installation tolerances, a radially moveable shaft and collar 32 is displaced, along with the bearing body 10 and carrier 8, by adjustment of the set screws 46. Radial displacement of the shaft axis 34 is effected through engagement between the cylindrical surface of the collar section 38 and the bearing face of the bearing liner 11. The displacement of the bearing body 10 and carrier 8 is usually greater than that encountered in instances wherein only bearing play is to be adjusted. For such reason, the diameter of the oversized bores 56 are sufficiently large to accommodate the anticipated range of displacement.

After the desired axial shaft position has been adjusted, the shaft is radially secured and uniform bearing play can then be adjusted. It should be appreciated that adjustment for deformation of the dimensions of the bearing body 10, e.g. the bearing face of the bearing liner 11, is unnecessary since the shaft was displaced without resistance.

For adjustment of the bearing either for bearing clearance, shaft position, or both, only components accessible from the outside of the bearing housing 6 are utilized, namely, the cap screws 54, the set screws 46 and the bearing clearance is measured by access through the removed seal ring 14.

Due to the capacity of the adjustable bearing assembly 4 to change the position of the axis of the shaft 24 relative to the bearing housing 6, bearings and shafts may be manufactured with greater tolerances, hence lower production costs.

Further, due to the employment of standard fastening and adjusting elements such as standard cap screws and set screws, cost savings are achieved.

The adjustable bearing assembly 4 is well suited to provide precise bearing clearance adjustments in vertical axis rotor bearings to reduce or eliminate oil whip through the generation of radial forces for dynamic stabilization of the rotor.

Additionally, the construction of the adjustable baring assembly is readily adaptable for spherical bearing applications by employing a carrier with spherical surfaces, in engagement with spherical surfaces of a bearing body.

Figure 3:
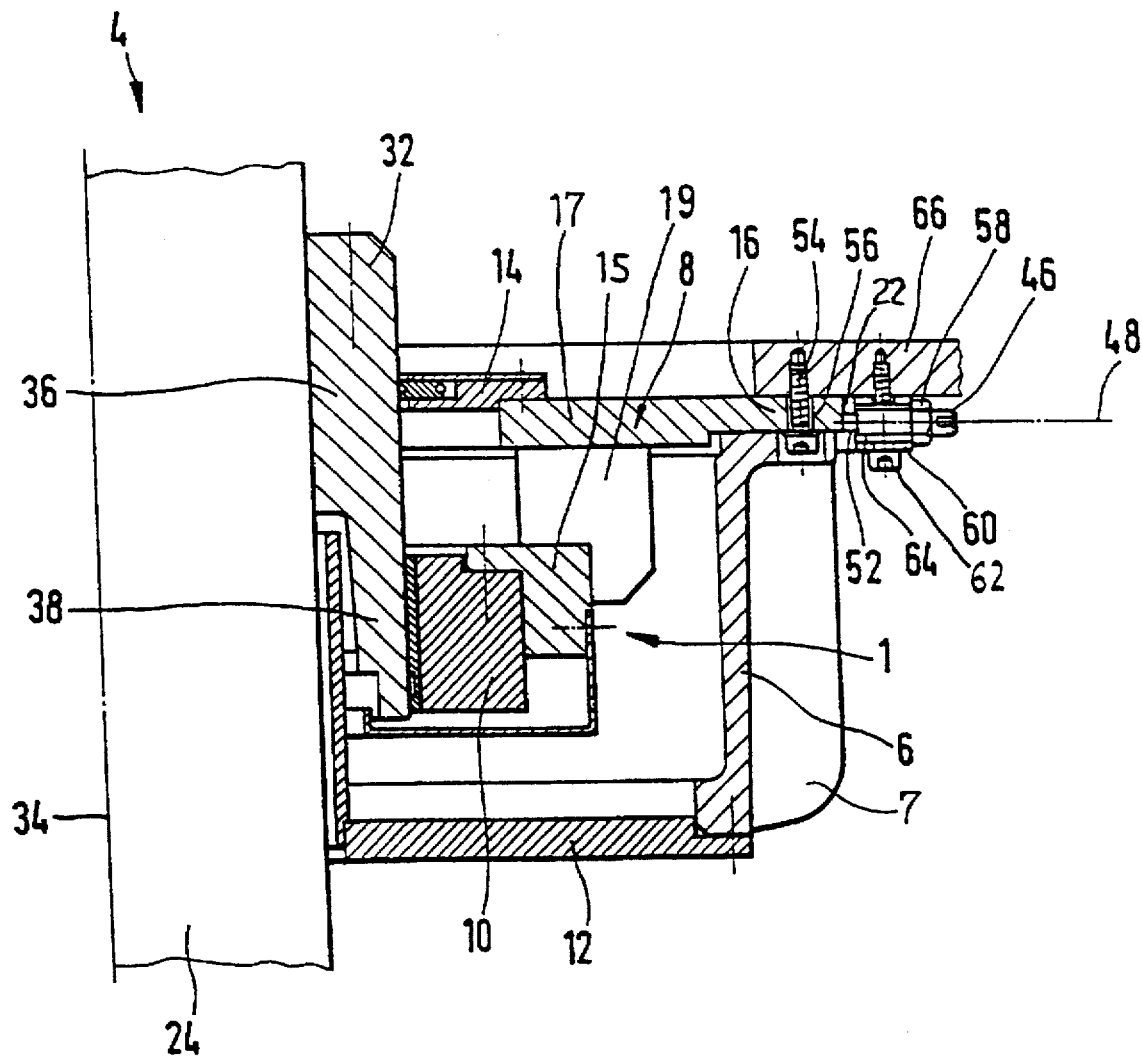
FIG. 3 is a fragmentary vertical sectional view through an alternate embodiment of the invention, wherein the adjustable bearing comprises a journal bearing.

An alternate embodiment of the adjustable bearing assembly 4 configured without a thrust bearing subassembly is depicted in FIG. 3 wherein like numerals have been employed to denote like components of the embodiment previously described. In this embodiment, engagement between a shaft 24 and a bearing body 10 is identical to that of the prior embodiment. This embodiment differs, however, in the configuration of a cover 17 of a bearing carrier which includes a thicker peripheral lip 16 than that of the prior embodiment. Further, in contrast to the prior embodiment, a plurality of set screws 46 are seated in equidistantly spaced threaded radial bores 64 of a separate ring 60 which is fastened by a plurality of cap screws 62 to a support plate 66 of a machine or apparatus carrying the adjustable bearing assembly 4.

The cover 17 of the bearing carrier 8 is releasably fixed to the support plate 66 by a plurality of cap screws 54, extending through oversized apertures 56 in the cover. A cylindrical bearing housing 6 is also fixed relative to the support plate 66 by fastening means, not shown.

As with the previous embodiment, radial adjustment of the bearing body relative to the housing 6 is achieved by rotation of the set screws 46 whose ends bear against a cylindrical wall 22 of the lip 16. After the position of the bearing body 10 has been adjusted, the bearing body 10 and carrier 8 are fixed, relative to the housing 6 and the support plate 66 by tightening the cap screws 54.

In lieu of employing set screws 46, other setting elements such as pins or the like which are clamped in place in the housing flange 18 or in the ring 60 may be employed.

Further, it is evident to those of skill in the art that the bearing body 10 can comprise either a single cylindrical journal bearing, with or without a separate liner and with a single cylindrical bearing surface or with several bearing surface segments disposed in a circle. Further, several bearing bodies may be employed disposed in circle with each bearing body having a separate bearing surface. The several bearing bodies can be fixed to a single carrier 8 or a plurality of carrier segments.

Figure 4:
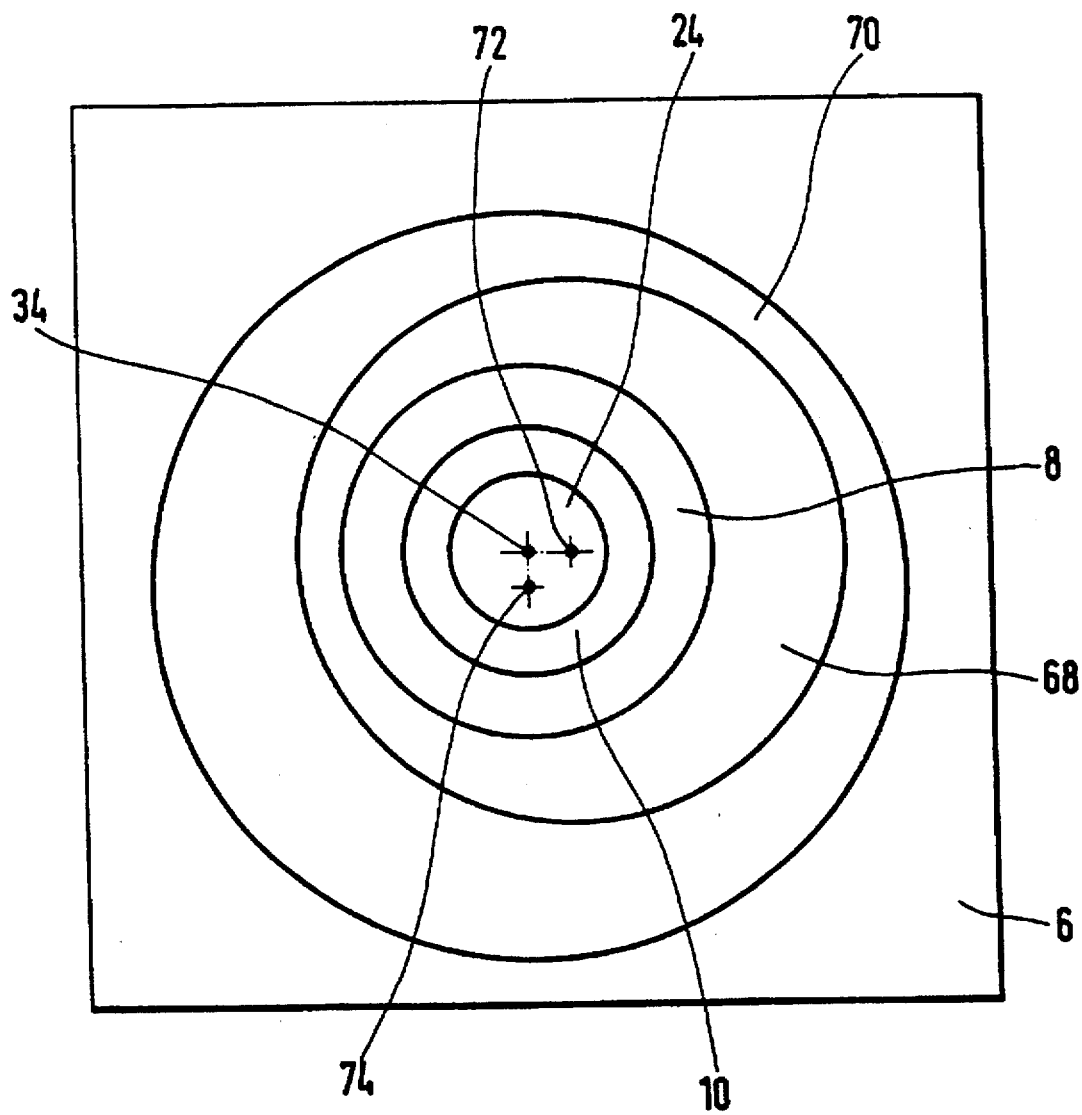
FIG. 4 is a transverse radial sectional view through a further embodiment of the invention wherein the position of a bearing body relative to a bearing housing is adjusted by relative movement of two eccentric carriers.

A further embodiment of the adjustable bearing assembly is illustrated in FIG. 4, wherein like numerals have been employed to denote like components of the previous embodiments.

In this embodiment, the adjustable bearing assembly includes a housing 6 having an inner cylindrical surface. A shaft 24, rotatable about an axis 34 is engaged by a cylindrical journal bearing body 10 which, in turn, is fixed to a cylindrical carrier 8.

The carrier 8 is itself positioned within a cylindrical bore of an inner eccentric ring 68 having an axis of rotation 72, which is parallel to the axis 34. The inner eccentric ring 68 is in engagement with an outer eccentric ring 70, having an axis of rotation 74, which is parallel to the axes 34 and 72. The outer periphery of the outer eccentric ring 70 is in engagement with the inner cylindrical surface of the housing 6.

Since the axes 34, 72 and 74 are spaced from one another and are not in a straight line, the position of the bearing body 10 is adjustable relative to the housing 6 by rotation of the eccentric rings 68, 70 relative to one another and relative to the housing 6.

As with the prior embodiments, adjustment of the bearing body 10 relative to the housing 6 may be employed to position the shaft 24, if the shaft is axially moveable and to thereafter adjust for uniform bearing clearance. If the shaft 24 is not axially adjustable, movement of the eccentric rings 68, 70 to effect movement of the bearing body 10 is employed for the purpose of adjusting clearance between the bearing surface of the bearing body 10 and the running cylindrical periphery of the shaft 24, or, in instances wherein a shaft collar is employed, the running surface of the shaft collar.

After the position of the bearing body relative to the housing has been adjusted by manipulation of the eccentric rings, the rings are fixed relative to one another and to the housing by suitable locking means such as an axial (end) compression clamp employing friction pads, radial pins, etc.

Thus it will be seen that there is provided an adjustable bearing assembly which achieves the various aspects, features and considerations of the present invention and which is well suited to meet the conditions of practical use.

Since various possible embodiments might be made of the present invention and since various changes might be made in the exemplary embodiments shown herein without departing from the spirit of the invention, it is to be understood that all matter herein described shown in the accompanying drawings is to be interpreted as illustrative and not in a limiting sense.

Having thus described the invention, there is claimed as new and desired to be secured by Letters Patent:

1. An adjustable bearing assembly for a rotating shaft having an axis and a running face, the adjustable bearing assembly comprising a bearing housing, means for mounting the assembly to a support surface, the shaft rotating about its axis relative to the support surface, bearing body means including a bearing face engageable with the running face for supporting the shaft, the bearing body means being positioned within the housing, carrier means for supporting the bearing body means within the housing, the carrier means including a bearing cover having a periphery and means for adjusting the position of the carrier means relative to the support surface from the outside of the housing, the means for adjusting engaging the periphery, the cover including a radial lip, the bearing assembly further including means for fixing the position of the carrier means after the carrier means has been adjusted relative to the support surface, the fixing means including an aperture extending through the lip and screw means positioned within the aperture and engaging a threaded bore, the bore being fixed relative to the housing, whereby the bearing body may be moved relative to the support surface.

2. An adjustable bearing assembly as constructed in accordance with claim 1 wherein the means for adjusting the position of the carrier means includes means for adjusting the position of the carrier means relative to the housing.

3. An adjustable bearing assembly as constructed in accordance with claim 1 wherein the bearing body means comprises a journal bearing.

4. An adjustable bearing assembly as constructed in accordance with claim 3 wherein the means for adjusting the position of the carrier means comprises a plurality of set screws, each set screw having an end engageable against the periphery, each set screw engaging a threaded aperture, each threaded aperture extending through set screw support means, the set screw support means being fixed relative to the support surface.

5. An adjustable bearing assembly as constructed in accordance with claim 4 wherein the set screw support means comprises a portion of the housing.

6. An adjustable bearing assembly as constructed in accordance with claim 4 wherein the set screw support means comprises a ring, the ring being fixed to the support surface.

7. An adjustable bearing assembly as constructed in accordance with claim 4 wherein each threaded aperture includes an axis, the axes of the threaded apertures being coplanar.

8. An adjustable bearing assembly as constructed in accordance with claim 7 wherein the threaded apertures are equidistantly spaced from one another about a circle and each axis is oriented radially toward a common center.

9. An adjustable bearing assembly as constructed in accordance with claim 3 wherein the bearing assembly comprises a combined journal-thrust bearing.

10. An adjustable bearing assembly as constructed in accordance with claim 3 wherein the bearing body is closed and the bearing face is cylindrical.

11. An adjustable bearing assembly as constructed in accordance with claim 1 wherein the cover is fastened to the support surface by a plurality of screws for resisting radial forces generated by rotation of the shaft within the bearing body.

12. An adjustable bearing assembly as constructed in accordance with claim 9 wherein the cover includes a central aperture, the rotating shaft projecting through the central aperture, the bearing assembly further including seal ring means for retaining lubricant within the bearing assembly, the seal ring means selectively closing the central aperture, the seal ring means being removable to access the bearing body for measurement of clearance between the bearing face and the running face.

13. An adjustable bearing assembly as constructed in accordance with claim 1 wherein the bearing body includes a bearing axis, the bearing axis and the rotating shaft axis being vertically disposed.

14. A method of adjusting the bearing clearance between a rotating shaft and an adjustable bearing assembly to a predetermined specified radial clearance, the rotating shaft having an axis and a running face, the adjustable bearing assembly comprising a bearing housing, means for mounting the assembly to a support surface, the shaft rotating about its axis relative to the support surface, bearing body means including a bearing face engageable with the running face for supporting the shaft, the bearing body means being positioned within the housing, carrier means for supporting the bearing body means within the housing and means for adjusting the position of the carrier means relative to the support surface, the method comprising the steps of:

(a) measuring the radial clearance between the running face of the rotating shaft and the bearing face of the bearing assembly along various points;

(b) noting the measurements obtained;

(c) laterally moving the carrier means in a desired direction toward a point on the circumference of the running face which is diagonally opposite a point noted to have less radial clearance than specified;

(d) repeating steps (a), (b) and (c) until uniform clearance is measured; and (e) locking the carrier means against further movement.

15. A method of adjusting the bearing clearance between a rotating shaft and an adjustable bearing assembly in accordance with claim 14 wherein the carrier means is engaged by set screws, the step of laterally moving the carrier means including:

(i) backing off selected set screws to provide clearance for movement in the desired direction and advancing selected set screws to provide movement in the desired direction.

16. An adjustable bearing assembly as constructed in accordance with claim 1, the lip including a plurality of apertures, screw means being positioned within each aperture and engaging a threaded bore, each threaded bore being fixed relative to the housing.

17. An adjustable bearing assembly as constructed in accordance with claim 1 further including means fixing the housing relative to the support surface, the threaded bore being positioned in the housing.

18. An adjustable bearing assembly for a rotating shaft having an axis and a running face, the adjustable bearing assembly comprising a bearing housing, means for mounting the assembly to a support surface, the shaft rotating about its axis relative to the support surface, bearing body means including a bearing face engageable with the running face for supporting the shaft, the bearing body means being positioned within the housing, carrier means for supporting the bearing body means within the housing, the carrier means including a bearing cover having a periphery and means for adjusting the position of the carrier means relative to the support surface from the outside of the housing, the means for adjusting engaging the periphery, the cover including a radial lip, the bearing assembly further including means for fixing the position of the carrier means after the carrier means has been adjusted relative to the support surface, the fixing means including a plurality of apertures extending through the lip and screw means positioned within each aperture and engaging a threaded bore in the housing whereby the bearing body may be moved relative to the support surface.

* * * * *